US010784631B2

(12) United States Patent
Brungard et al.

(10) Patent No.: US 10,784,631 B2
(45) Date of Patent: Sep. 22, 2020

(54) MULTI-PIECE POWER CONNECTOR WITH CABLE PASS THROUGH

(71) Applicant: FCI USA LLC, Etters, PA (US)

(72) Inventors: Thomas Brungard, York, PA (US); Rupert Fry, Jr., Mechanicsburg, PA (US)

(73) Assignee: FCI USA LLC, Etters, PA (US)

( * ) Notice: Subject to any disclaimer, the term of this patent is extended or adjusted under 35 U.S.C. 154(b) by 0 days.

(21) Appl. No.: 15/883,946

(22) Filed: Jan. 30, 2018

(65) Prior Publication Data
US 2018/0219332 A1    Aug. 2, 2018

Related U.S. Application Data

(60) Provisional application No. 62/452,216, filed on Jan. 30, 2017.

(51) Int. Cl.
*H01R 13/6587* (2011.01)
*H01R 12/72* (2011.01)
(Continued)

(52) U.S. Cl.
CPC ..... *H01R 13/6587* (2013.01); *H01R 12/7082* (2013.01); *H01R 12/7088* (2013.01);
(Continued)

(58) Field of Classification Search
CPC .. H01R 9/2408; H01R 13/514; H01R 13/506; H01R 13/6587; H01R 13/629;
(Continued)

(56) References Cited

U.S. PATENT DOCUMENTS

| 6,257,918 | B1 * | 7/2001 | Yamamoto | ......... | H01R 13/6315 |
| | | | | | 439/34 |
| 6,848,950 | B2 * | 2/2005 | Allison | ................. | H01R 12/75 |
| | | | | | 439/682 |

(Continued)

FOREIGN PATENT DOCUMENTS

CN          204391374 U      6/2015

OTHER PUBLICATIONS

International Search Report and Written Opinion for International Application No. PCT/US2018/015868 dated May 10, 2018.
(Continued)

*Primary Examiner* — Gary F Paumen
(74) *Attorney, Agent, or Firm* — Wolf, Greenfield & Sacks, P.C.

(57) ABSTRACT

A modular, hybrid electrical connector suitable for use as a power connector with contacts for different types of power. Portions of the connector may be electrically and mechanically connected to an electronic assembly at different times or in different ways. A first portion of the connector may be electrically connected to a printed circuit board within the assembly. A second portion may be subsequently attached to the first portion and electrically connected to other components within the assembly through cables. With this configuration, the first portion may carry power contacts, coupled to a DC supply through the printed circuit board, and the second portion may carry power contacts, coupled to an AC supply through the cables. The first portion may be soldered to the printed circuit board such as through a reflow operation, without the heat of the reflow damaging the insulation of the cable, which may degrade if heated.

30 Claims, 8 Drawing Sheets

(51) Int. Cl.
  *H01R 43/02* (2006.01)
  *H01R 27/02* (2006.01)
  *H01R 13/629* (2006.01)
  *H01R 13/426* (2006.01)
  *H01R 12/70* (2011.01)
  *H01R 12/71* (2011.01)
  *H01R 13/26* (2006.01)
  *H01R 13/66* (2006.01)
  *H01Q 1/02* (2006.01)
  *H01R 13/11* (2006.01)
  *H01R 13/20* (2006.01)
  *H04Q 1/02* (2006.01)

(52) U.S. Cl.
  CPC ......... *H01R 12/714* (2013.01); *H01R 12/724* (2013.01); *H01R 13/26* (2013.01); *H01R 13/426* (2013.01); *H01R 13/629* (2013.01); *H01R 13/665* (2013.01); *H01R 27/02* (2013.01); *H01R 43/0256* (2013.01); *H04Q 1/15* (2013.01); *H01R 13/113* (2013.01); *H01R 13/20* (2013.01)

(58) Field of Classification Search
  CPC .... H01R 13/426; H01R 13/26; H01R 13/665; H01R 13/113; H01R 13/20; H01R 12/724; H01R 12/7082; H01R 12/7088; H01R 12/714; H01R 43/0256; H01R 27/02; H04Q 1/15
  USPC ................. 439/715, 717, 701, 364
  See application file for complete search history.

(56) References Cited

U.S. PATENT DOCUMENTS

| | | | |
|---|---|---|---|
| 7,976,317 B2* | 7/2011 | Patel ............... | H01R 12/7088 439/699.1 |
| 2002/0098743 A1 | 7/2002 | Schell et al. | |
| 2004/0147177 A1 | 7/2004 | Wagner | |
| 2004/0235320 A1 | 11/2004 | Holmes et al. | |
| 2004/0235357 A1 | 11/2004 | Allison et al. | |
| 2007/0293084 A1 | 12/2007 | Ngo | |
| 2009/0142953 A1 | 6/2009 | Patel et al. | |
| 2012/0289071 A1 | 11/2012 | Dodds et al. | |
| 2013/0224971 A1 | 8/2013 | Patel et al. | |
| 2018/0034190 A1 | 2/2018 | Ngo | |

OTHER PUBLICATIONS

CN 201880022142.4, Jun. 19, 2020, Chinese office action.
Chinese office action in connection with Chinese Application No. 201880022142.4, dated Jun. 19, 2020.

* cited by examiner

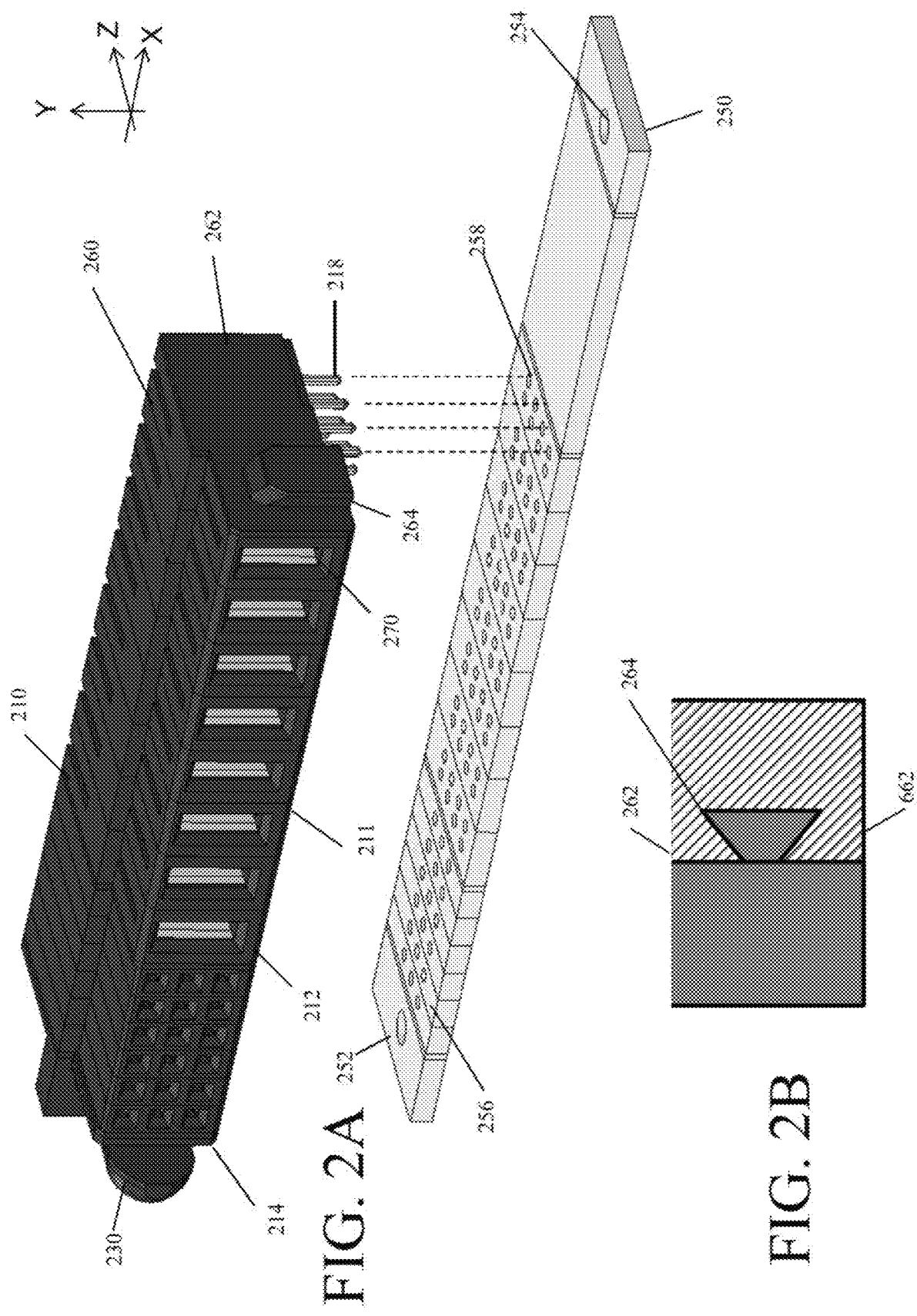

MULTI-PIECE POWER CONNECTOR WITH CABLE PASS THROUGH

CROSS REFERENCE TO RELATED APPLICATIONS

This application the benefit under 35 U.S.C. § 119(e) of U.S. Provisional Patent Application Ser. No. 62/452,216, filed Jan. 30, 2017, and entitled "MULTI-PIECE POWER CONNECTOR WITH CABLE PASS THROUGH," the entire contents of which is incorporated by reference herein.

BACKGROUND

This patent application relates generally to interconnection systems, such as those including electrical connectors, used to interconnect electronic assemblies.

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughterboards" or "daughtercards," may be connected through the backplane.

A backplane is a printed circuit board onto which many connectors may be mounted. Conducting traces in the backplane may be electrically connected to signal conductors in the connectors so that signals may be routed between the connectors. Power planes within the backplane supply power to active components that may be mounted to the backplane as well as to connectors that are attached to the backplane so that power can be coupled through those connectors to the daughtercards.

Frequently, the backplane is installed in a rack or other enclosure that houses one or more power supplies. As many electronic components operate on DC power, frequently the power supplies output DC power. However, some electronic systems may additionally or alternatively include AC power supplies.

Connectors may also be used in other configurations for interconnecting printed circuit boards. Some systems use a midplane configuration. Similar to a backplane, a midplane has connectors mounted on one surface that are interconnected by conductive traces within the midplane. The midplane additionally has connectors mounted on a second side so that daughter cards are inserted into both sides of the midplane. As another example the connectors may be configured for a mezzanine or stacker configuration in which the connectors make connections between printed circuit boards mounted in parallel. Further, connectors may be used to connect cables to a printed circuit board. In that configuration, a connector, configured to mate with a connector attached to a printed circuit board, may be attached a cable.

Regardless of the specific components connected, a connector within an electronic assembly may carry both data and power between those components. The connector may have differentiated contacts to better carry signal or power. Signal contacts generally are shaped to provide a desired characteristic impedance to match the components generating or receiving those signals, and have a lower current carrying capacity than power contacts. Power contacts, in contrast, may have a much higher current carrying capacity, but may have a higher inductance or other characteristics that differ from signal conductors.

In many electronic systems, separate signal and power connectors are used, with signal connectors having only contacts that are suitable for carrying signals and power connectors having only contacts that are suitable for carrying power. However, some known connectors have both signal and power conductors.

Signal conductors typically have contact tails that are suitable for connection to a printed circuit board through soldering or by insertion into holes in the printed circuit board. Power conductors similarly may have contact tails suitable for connection to a printed circuit board. However, in some systems, the power conductors may have tails configured to attach to power cables. The power cables may be connected to a power source, avoiding the need for large amounts of current to pass through the backplane or other printed circuit board to which the connector is attached.

SUMMARY

Embodiments of a hybrid power connector support a connector in which some power conductors are connected to a source of power through a printed circuit board to which the connector is attached while other power conductors connect to a source of power through cables. Embodiments of a multi-piece connector support an assembly technique in which a first portion of the connector, with conductors that attach to a printed circuit board, is first mounted to the printed circuit. A second portion of the connector, with conductors that attach to cables, may be subsequently attached to the first portion. The assembly may be heated to a solder reflow temperature before the second portion of the connector is attached, shielding the cable, and its insulation, from exposure to the solder reflow temperature.

In accordance with some embodiments, an electrical connector may comprise a first housing portion, comprising a first attachment feature and a first plurality of conductors; and a second housing portion, comprising a second attachment feature and a second plurality of conductors. The second attachment feature may be configured to engage with the first attachment feature. The first plurality of conductors may comprise tails configured for attachment to a printed circuit board. The second plurality of conductors may comprise tails configured for attachment to a wire.

In accordance with further embodiments, an electrical assembly may comprise a printed circuit board, a first connector and a second connector. The first connector may comprise a first housing portion, the first housing portion comprising a first plurality of contacts. The second housing portion may comprise a second plurality of contacts. The first housing portion may be separable from and attached to the first housing portion. The second connector may be configured to mate with the first connector as defined by the first housing portion and the second housing portion, the second connector comprising a unitary housing.

In accordance with yet a further aspect, a method of manufacturing an electronic assembly may be provided. The electronic assembly may include a printed circuit board having a plurality of vias therein and a connector. The method may comprise mounting a first portion of the connector to the printed circuit board, the mounting comprising making electrical connections between contacts in the first portion and vias of the printed circuit board; and attaching a second portion of the connector to the first portion of the connector by sliding an engagement feature of the second portion with respect to a complementary engagement feature on the first portion. The second portion of the connector may comprise contacts attached to cables.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is a perspective view illustrating a step in the manufacture of an electronic assembly comprising a multi-piece hybrid connector, in accordance with some embodiments;

FIG. 2B is a cross section through attachment features of portions of a multi-piece hybrid connector in an attached configuration, in accordance with some embodiments;

DESCRIPTION OF PREFERRED EMBODIMENTS

Figure 1A:
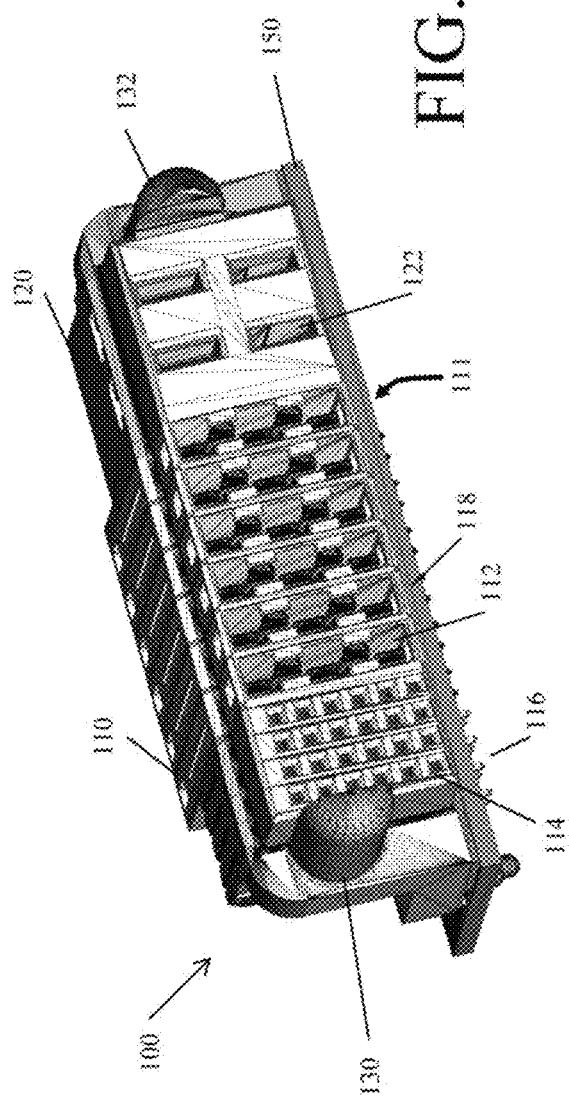
FIG. 1A is a perspective view of a mating face of a hybrid connector, in accordance with some embodiments.

The inventors have recognized and appreciated that lower cost and higher performance electronic systems may be provided with hybrid electrical connectors that include some contacts with tails configured to be attached to a printed circuit board and other contacts configured to be attached to cables. In some embodiments, both types of contacts may be configured as power contacts. With this configuration, an electronic assembly may supply two types of power through the same connector. For example, some contacts in the connector may be connected to one or more sources of DC power and other contacts may be connected to AC power. Alternatively or additionally, the types of power may be differentiated based on voltage or other characteristics.

Such a connector, for example, enables efficient connections to DC power sources through a printed circuit board and to AC power sources through cables. Alternatively or additionally, such a connector enables efficient connections to lower voltage power sources through the printed circuit board and to higher voltage power sources through cables. In this way, the printed circuit board, as it carries only lower voltages, may have reduced manufacturing requirements, which can reduce the cost of the printed circuit board and the assembly containing it. In this context, low voltage may be less than 25 V, and in some embodiments may be less than 20V, less than 15V or, as specific examples 12V, 10V and/or 5V. Such low voltages may be DC voltages. In contrast, high voltages may be 60V or greater, such as 110 or 120 V. In some embodiments, high voltages may be in the range of 60-240V.

The inventors have further recognized and appreciated that manufacture of electronic systems with such hybrid connectors is facilitated with multi-piece connectors. A first portion of the connector may contain contacts configured for attachment to a printed circuit board. A second portion of the connector may contain contacts configured for attachment to cables. The connector portions may have complimentary attachment features such that the connector portions may be attached to each other.

In some embodiments, an attachment feature of the second connector portion may be configured to slidably engage an attachment feature of the first connector portion. In this configuration, the first connector portion may be mounted to the printed circuit board and then the second connector portion may be slid into attachment with the first connector portion. The sliding motion, for example, may be in a direction perpendicular to and toward an upper surface of the printed circuit board or may be in a direction parallel to and along the upper surface of the printed circuit board. Such an attachment configuration enables the first portion to be attached to the board with a process that involves heating the printed circuit board to a sufficiently high temperature to cause solder reflow, without the cables being attached to the board. A second piece, containing the cables, may be attached to the first piece after the heating is completed. Heating the cables to a solder reflow temperature, which can typically be hundreds of degrees C., may damage or degrade the insulation on the cables, which is typically a plastic or polymer. A multi-piece connector as described herein avoids the risk of damage or degradation to the cable insulation.

The connector portions may be configured such that, when attached, they act as a single connector. Each portion, for example, may have a mating face and the mating faces may be held side by side in a common plane. As a result, the connector resulting from attaching the portions may mate with a single connector. Additionally, features for guidance, polarization, connector hold-down, or other functions may be distributed across the portions such that, when the portions are attached, the features on the individual portions collectively perform the function for one connector. For example, each portion may have a guidance feature and a hold-down feature.

In some embodiments, the single connector provided by attaching the connector portions together may have the same size as a comparable connector made with a unitary housing. Such a size, for example, may result from integrating attachment features in side surfaces of the connector portions. The attachment features may be configured to hold the side surfaces together. The attachment features may include a projection from a surface of one of the connector portions that engages with a complimentary groove in the surface of the other connector. As a specific example, the projection may be a dovetail and the groove may have a complimentary shape and size such that, upon attachment of the two portions, the side surfaces are pulled together.

Figure 1B:
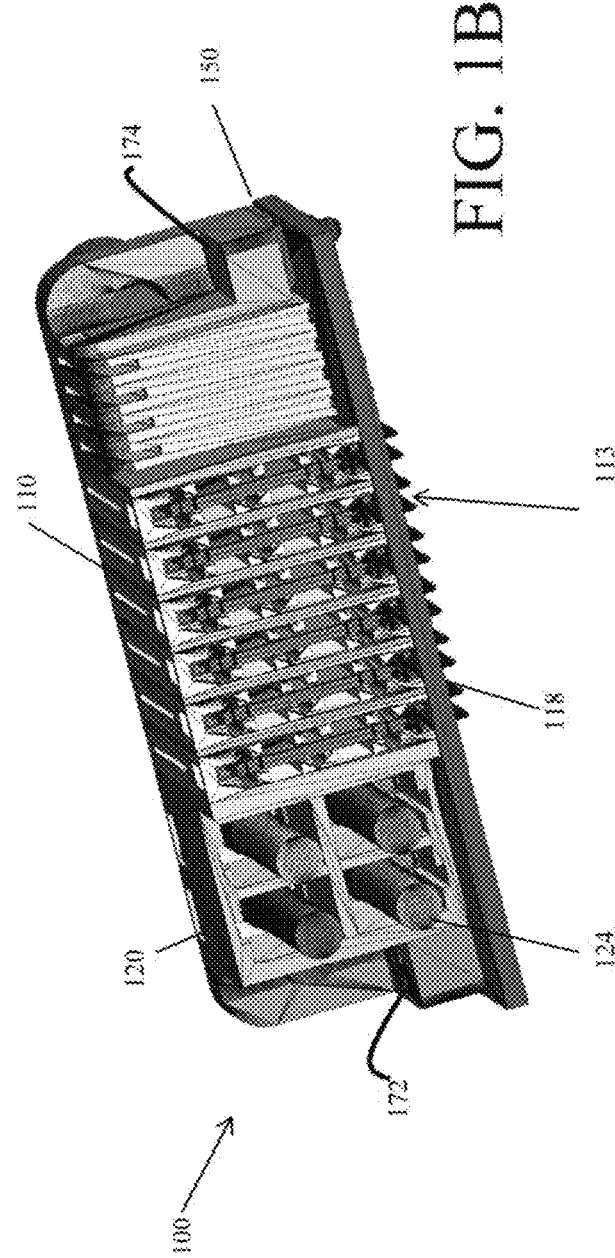
FIG. 1B is perspective view of a rear of the hybrid connector of FIG. 1A.

Turning now to FIGS. 1A and 1B, a hybrid power connector 100 is illustrated. FIG. 1A shows the mating face 111 of connector 100. FIG. 1B shows rear face 113. Hybrid power connector 100 includes power contacts that accommodate different types of power. In the embodiment illustrated, openings 114 in mating face 111 expose signal conductors. Openings 112 and 122 expose power conductors. In the embodiment illustrated, openings 112 are larger than openings 122, such that they receive conductors for carrying larger amounts of power than those received in openings 122.

The conductive elements configured as power conductors may be wider than the conductive elements serving as signal conductors. In this context the width may be measured in a direction perpendicular to a flow of current from a contact tail to a mating contact portion. The width may be an average width over that current flow path. A signal conductors, for example may have a width of 2 mm or less. A power conductor, in contrast, may have a width at least four times the width of the signal contact, such as 8 mm or more. In some embodiments, a signal conductor may have a width that is less than 20% of the width of the power conductor. For example the width of a signal conductor may be 1%, 5%, 10%, 15%, 19.9%, or any suitable percentage of the width of a power conductor. The wider structure may provide a lower resistance to the power conductors, such as 0.4 mΩ or less. In contrast, a signal conductor may have a resistance of up to 20 mΩ, such as 10 mΩ to 20 mΩ.

These relative dimensions enable the power conductors to carry more current than signal conductors without negative effects such as heating. A power conductor, for example, may carry 25 A with a temperature rise of 30° C. or less. Conditions under which temperature rise is measured are known in the art. The temperature rise may be measured with a connector at room temperature, such as approximately 20° C. Temperature may be measured in still air, as opposed to in an assembly with a fan circulating air for cooling. In some embodiments, contacts may be made wider, ganged together or otherwise made larger. In some embodiments, the contact may carry 65 A with a temperature rise of 30° C. or less.

Conductors may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Signal conductors within the openings 114 and power conductors within openings 112 may be configured for attachment to a printed circuit board 150, to which connector 100 is mounted. Contact tails 116 may be contact tails for signal conductors within openings 114. Contact tails 118 may be contact tails for power conductors within openings 112.

In this way, power conductors within openings 112 may be connected to sources of power through printed circuit board 150. Such connections may be made in a conventional way, such as by soldering contact tails 118 to vias on printed circuit board 150 that connect with power planes inside printed circuit board 150. The power sources may be the power sources as are conventionally used within an electronic assembly, such as DC power sources that supply electronic components on printed circuit board 150 or other printed circuit boards that may be connected to printed circuit board 150 by mating a complementary connector to connector 100.

In the illustrated configuration, power conductors within openings 122 do not have contact tails attached to printed circuit board 150. Rather, as can be seen in FIG. 1B, power conductors within openings 122 are connected to cables, such as cables 124 extending from the rear face 113. Cables 124 may be connected to one or more power sources. In this way, power conductors within openings 122 may be attached to different types of power sources than power conductors within opening 112. Cables 124, for example, may be connected to AC power sources or high-voltage power sources, avoiding the need to pass high voltages through printed circuit board 150.

Connector 100 may be a multi-piece connector. The pieces of the connector may be configured for use in an assembly process that can reduce manufacturing defects and/or reduce the failure rate of the resulting electronic assembly. In the exemplary embodiment of FIGS. 1A and 1B, connector 100 has portions 110 and 120. Portion 110 includes conductors with tails (e.g. 116 or 118) configured to be attached to a printed circuit board. Portion 120 includes conductors with tails configured to be attached to cables. The two portions are configured to be mounted to a printed circuit board in a flush, side-by-side configuration such that the connector formed by mounting the two portions may operate as a single connector.

In this example, connector 100 includes guidance features of 130 and 132. The guidance features have tapered surfaces and are positioned on opposite ends of connector 100, as in conventional connector design. However, in the embodiment illustrated, guidance feature 130 is on portion 110 and the guidance feature 132 is on portion 120. The guidance features may be formed in any suitable way including molding guidance features into the housings of portions 110 and 120. When the portions 110 and 120 are mounted side-by-side, guidance features 130 and 132 may be shaped and positioned as guidance features of a similar connector with a unitary housing.

Likewise, board hold-down features such as may be included in the conventional connector may be provided on portions 110 and 120 such that those features, when portions 110 and 120 are combined, serve as hold-down features for connector 100. Hold-down features 172 and 174 are visible in FIG. 1B. Hold-down features 172 and 174, for example, may be shaped and positioned like hold-down features in a similar connector with a unitary housing. In the illustrated example, hold-down features are implemented as holes in a shelf of the connector housing through which screws or other fasteners may be inserted.

FIGS. 1A and 1B illustrate a representative configuration of signal and power conductors that may be incorporated into a multi-piece, hybrid connector. FIGS. 2 through 7 illustrate a multi-piece hybrid connector with a different configuration. FIG. 2A illustrates a connector portion 210. As with connector 100, portion 210 includes a mating face 211 with openings through which conductors may be accessed by mating contact portions of a mating connector. In the example of FIG. 2A, openings 212 of mating face 211 expose power contacts 270. Signal contacts (not visible) are exposed through openings 214. The signal contacts and power contacts 270 in portion 210 may have a conventional configuration, or any other suitable configuration.

Those contacts may include tails, such as tails 218 extending through a board mounting surface of portion 210. In the example of FIG. 2A, tails 218 are configured as solder posts, which may be inserted into vias such as the vias 256 and/or 258 in printed circuit board 250. Tails 218 may then be soldered, using a conventional solder reflow process to printed circuit board 250.

Housing 260 of portion 210 may be made of an insulative material, such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

All of the above-described materials are suitable for use as binder material in manufacturing connectors. In accordance some embodiments, one or more fillers may be included in some or all of the binder material. As a non-limiting example, thermoplastic PPS filled to 30% by volume with glass fiber may be used to form the entire connector housing 260 or dielectric portions of the housings (e.g. 260).

Alternatively or additionally, portions of the housings (e.g. 260) may be formed of conductive materials, such as machined metal or pressed metal powder. In some embodiments, portions of the housing 260 may be formed of metal or other conductive material with dielectric members spacing signal conductors from the conductive portions. In the embodiment illustrated, for example, the housing 260 of backplane connector 200 may have regions formed of a conductive material with insulative members separating the intermediate portions of signal conductors from the conductive portions of the housing.

Regardless of the material used to form housing 260, the housing 260 may be sized and configured to receive one or more power conductors and one or more signal conductors. As in a conventional connector, those power and signal conductors may have mating contact portions and contact tails 218, adapted for attachment to a printed circuit board. Intermediate portions, joining the contact tails 218 and the mating contact portions may be held within the housing 260.

Housing 260 may also support or provide other connector features. Visible in FIG. 2A is a guidance feature 230. Hold-down features, and other connector features (not visible in FIG. 2A), may also be incorporated into housing 260. For example, connector portion 210 may include a hold-down feature that may receive a fastener inserted through hole 252 in printed circuit board 250.

Additionally, housing 260 may include attachment features to attach portion 210 to one or more other portions that, when combined with portion 210, form a single connector. Projection 264 is an example of such an attachment feature. In the illustrated embodiment, projection 264 projects from a side surface 262 of housing 260. Projection 264 is shaped and positioned to hold a second connector portion against surface 262.

FIG. 2B shows projection 264 in cross section. In that view, projection 264 is engaged with a complementary attachment feature in a second connector portion. The complementary attachment feature is a recess in a surface 662 of the second connector portion. In this example, projection 264 is a dovetail, such that insertion of the dovetail into the recess draws surfaces 662 and 262 together, allowing portion 210 and the second connector portion to be attached with no space between them. This flush mounting enables the portions to be combined to provide a multi-piece connector of the same size and shape as a conventional connector with a unitary housing.

FIG. 2A shows a portion 210 with a mating face 211 in a plane designated as an X-Y plane by the legend of FIG. 2A. An upper surface of printed circuit board 250 is in the X-Z plane. Attachment feature 264 is shaped and positioned so that a second portion may slide into the attached configuration as shown in FIG. 2B by moving the second portion along the Y axis (toward the surface of the printed circuit board). This attachment operation can be performed even after portion 210 is mounted to printed circuit board 250. As a result, tails 218 of portion 210 may be soldered to printed circuit board 250 before a second portion of the connector is added to the assembly.

Figure 3:
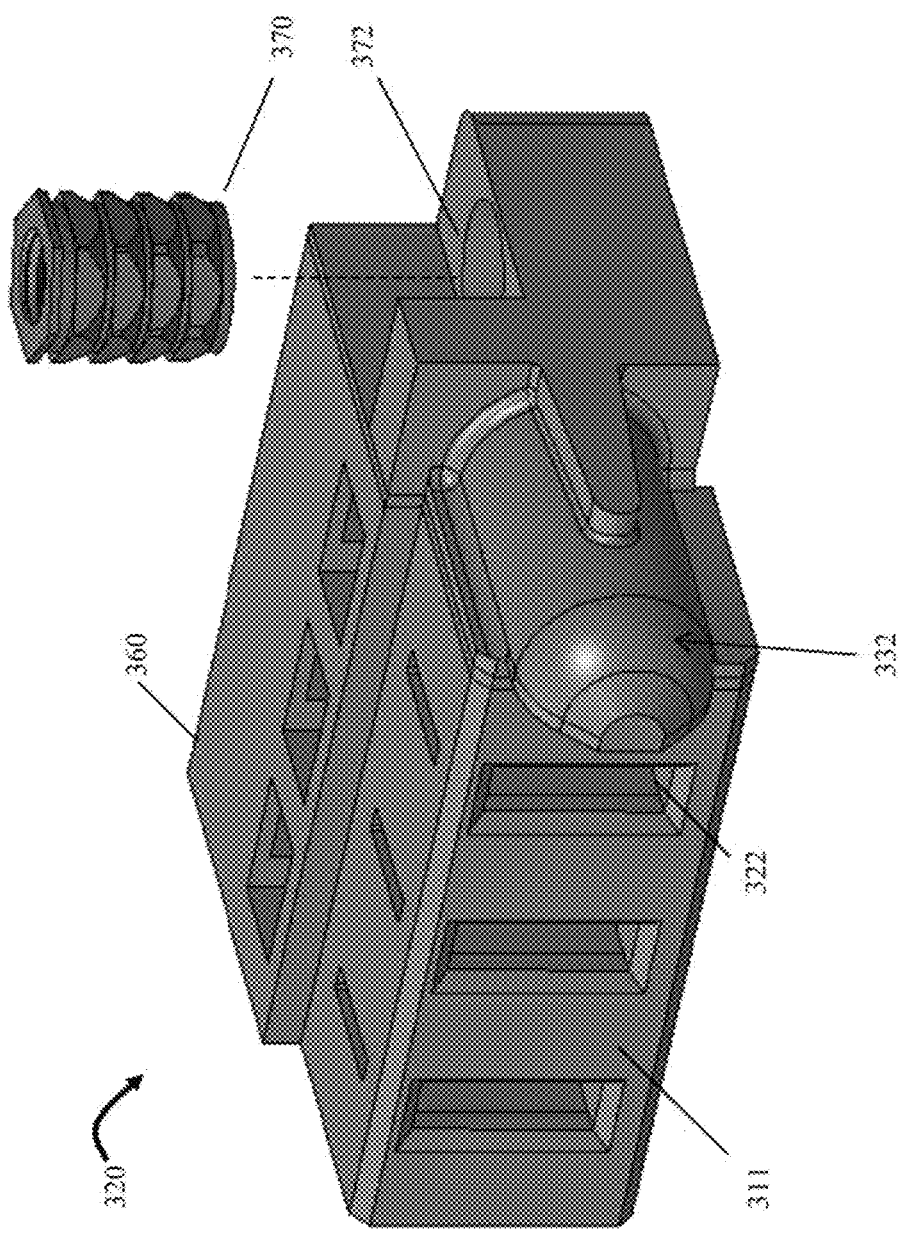
FIG. 3 is a perspective view, showing the mating face, of a portion of a multi-piece connector, in accordance with some embodiments.

FIG. 3 illustrates a second portion 320 that may be attached to portion 210 to form a connector. Portion 320 includes a mating face 311. Mating face 311 includes openings 322, providing access to the mating contact portions of power conductors that may be held within the housing 360 of portion 320.

Portion 320 may include connector features, such as for guidance and hold-down. In the example of FIG. 3, portion 320 includes guidance feature 332. In this example, guidance feature 332 is shaped as a projection with a tapered distal end similar to guidance feature 230. However, portion 320 may include any suitable number of guidance features of any suitable shape or size.

Portion 320 may also include board hold-down features, which may include a hole 372 and a nut 370. Nut 370 may fit within hole 372, which may be positioned to receive a fastener inserted through hole 254 (FIG. 2A) in printed circuit board 250. However, portion 320 may include any suitable number of board hold-down features of any suitable size and shape.

Housing 360 includes openings 322 in mating face 311 through which mating contacts of mating connector may be inserted to engage power conductors within portion 320. Housing 360 may enclose power conductors with mating contact portions positioned within openings 322. Those power conductors may be similarly shaped and sized to power conductors within portion 210. Alternatively or additionally, portion 320 may include power conductors with a different shape or size than the power conductors within portion 210, enabling the power conductors within portion 320 to carry a different type of power than those within portion 210.

Figure 4:
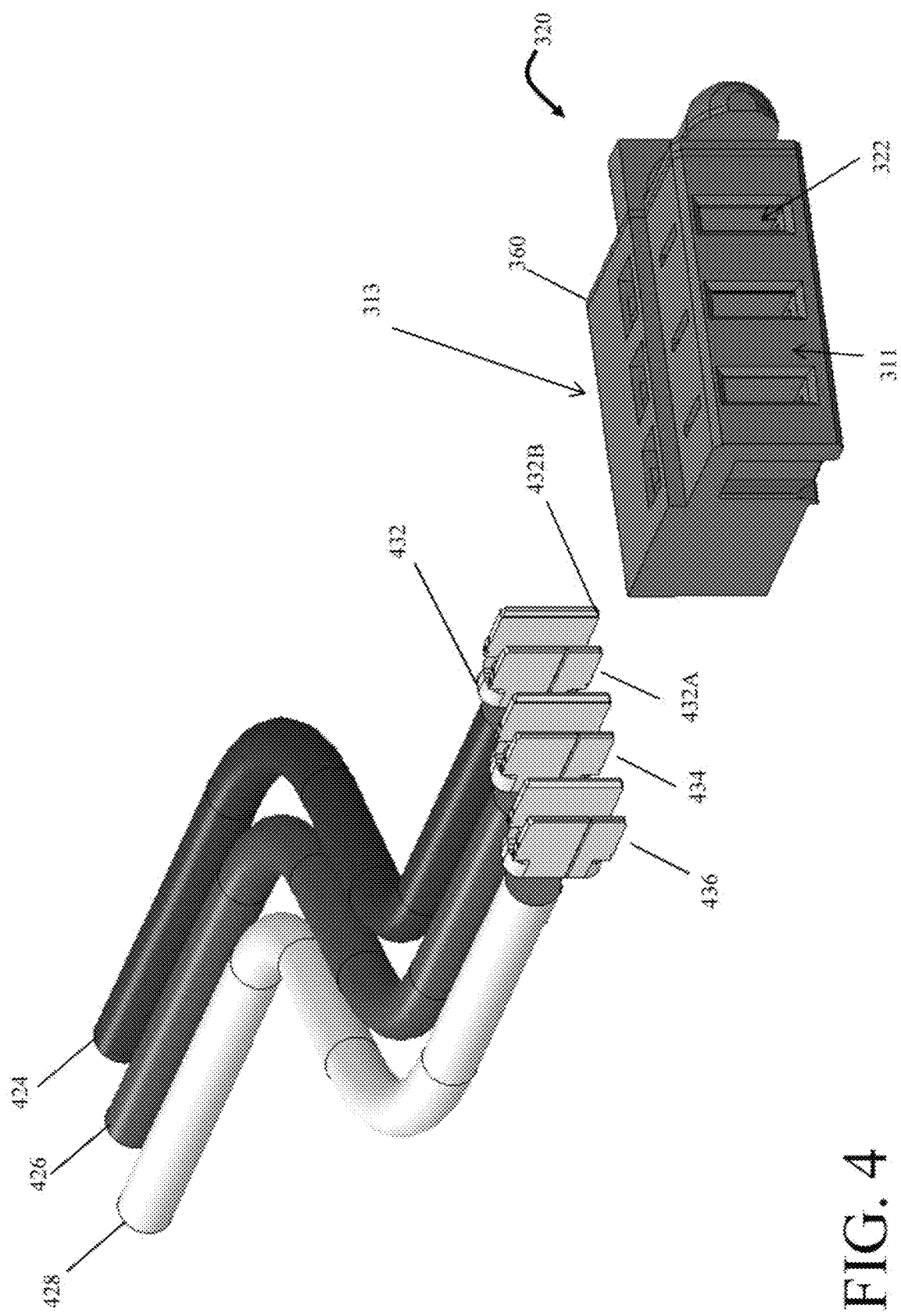
FIG. 4 is a perspective view illustrating a step in the manufacture of an electronic assembly comprising a multi-piece hybrid connector, including the portion of FIG. 3.

FIG. 4 illustrates power conductors 432, 434 and 436, which may be inserted into housing 360 through a rear face 313. In this example, each of power conductors 432, 434 and 436 has a mating contact portion shaped as two blades, such as blades 432A and 432B. Each of the blades may be aligned with one side of an opening 322, enabling a mating contact inserted into an opening 322 to make contact with both blades. Such a configuration, for example, may enable a relatively high current carrying capacity for the power conductors 432, 434 and 436, such as greater than 50 A.

Each of the power conductors 432, 434 and 436 may have a contact tail configured to attach to a cable, such as cable 424, 426 428, respectively. A contact tail for attachment to cable, for example, may have conductive wings that are designed to wrap around a conductor of the cable or may have a ring that is designed to have the conductor of the cable inserted into it then to be crushed around the conductors. Alternatively or additionally, a contact tail for attachment to a cable may have a relatively broad surface designed to have the conductor of the cable soldered or brazed to it. However, the contact tails may have any suitable configuration, including configurations as known in the art.

Figure 5:
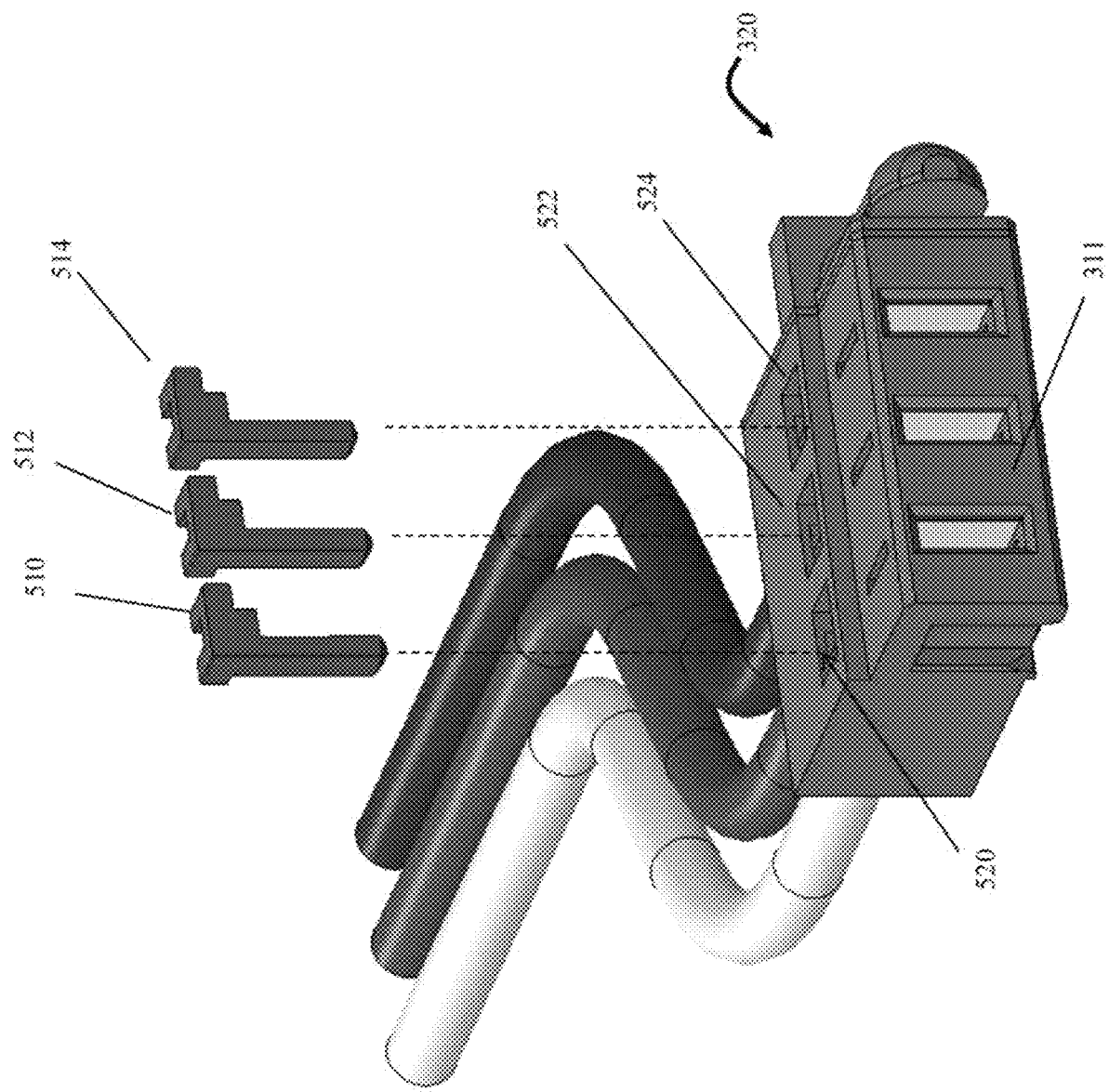
FIG. 5 is a perspective view illustrating a step in the manufacture of an electronic assembly comprising a multi-piece hybrid connector, including the portion of FIG. 3.

FIG. 4 illustrates the power conductors 432, 434 and 436 prior to insertion into housing 360 through rear face 313. FIG. 5 shows portion 320 with the power conductors inserted. Power conductors, including the attached cables, may be held within housing 360 in any suitable way. In the example of FIG. 5, housing 360 includes openings 520, 522 and 524 in a top surface of housing 360. Openings 520, 522 and 524 extend into housing 360 in a direction that is perpendicular to the direction in which openings 322 extend. Openings 520, 522 and 524 are aligned with and intersect respective openings 322 into which the power conductors are inserted. Accordingly, insertion of pins 510, 512 and 514 into openings 520, 522 and 524 may engage power conductors 432, 434 and 436, blocking their withdrawn from openings 322. However, any suitable techniques for holding conductors within a housing may be used, including barbs, or other suitable features.

Figure 6:
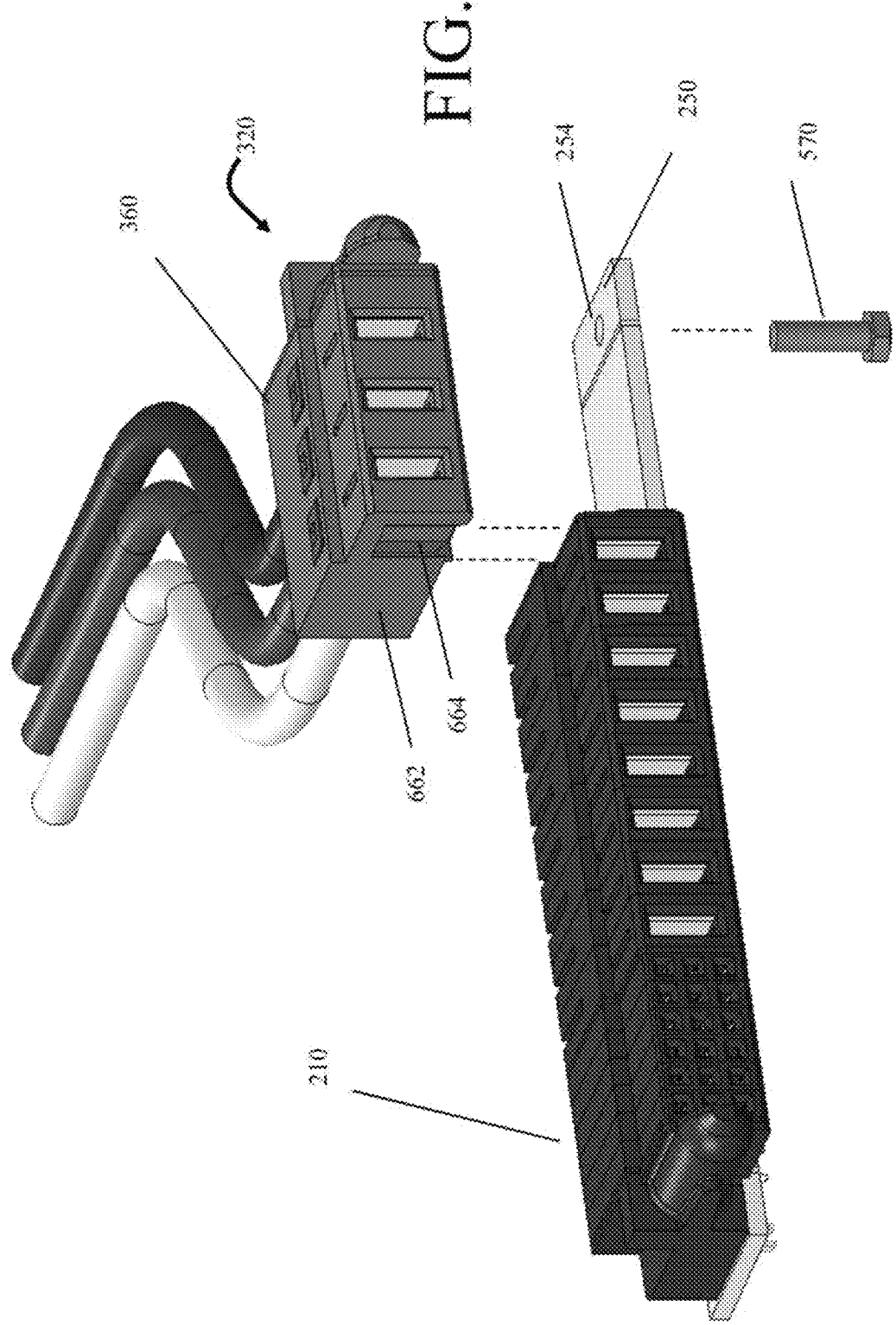
FIG. 6 is a perspective view illustrating a step in the manufacture of an electronic assembly comprising a multi-piece hybrid connector, including the portions shown in FIGS. 2A and 3.

FIG. 6 illustrates that portion 320, including power conductors with attached cables, may be added to an assembly including portion 210. Portion 320 may be secured to printed circuit board 250 and/or to portion 210. Portion 320 may be secured to a printed circuit board 250, such as with fastener 570, which may be a threaded fastener of the type known in the art or any other suitable fastener. Fastener 570, for example, may engage nut 370 (FIG. 3).

Portion 320 may include an attachment feature for engaging a complimentary attachment feature on portion 210. The attachment features on portion 320 may be configured to hold surfaces of portion 210 and 320 together. In the example of FIG. 6, portion 320 includes an attachment feature 664, which is configured as a recess within surface 662. As illustrated in FIG. 2B, when portion 320 is slid into engagement with portion 210, projection 264 will be within recess 664, drawing surface 662 against surface 262.

Figure 7:
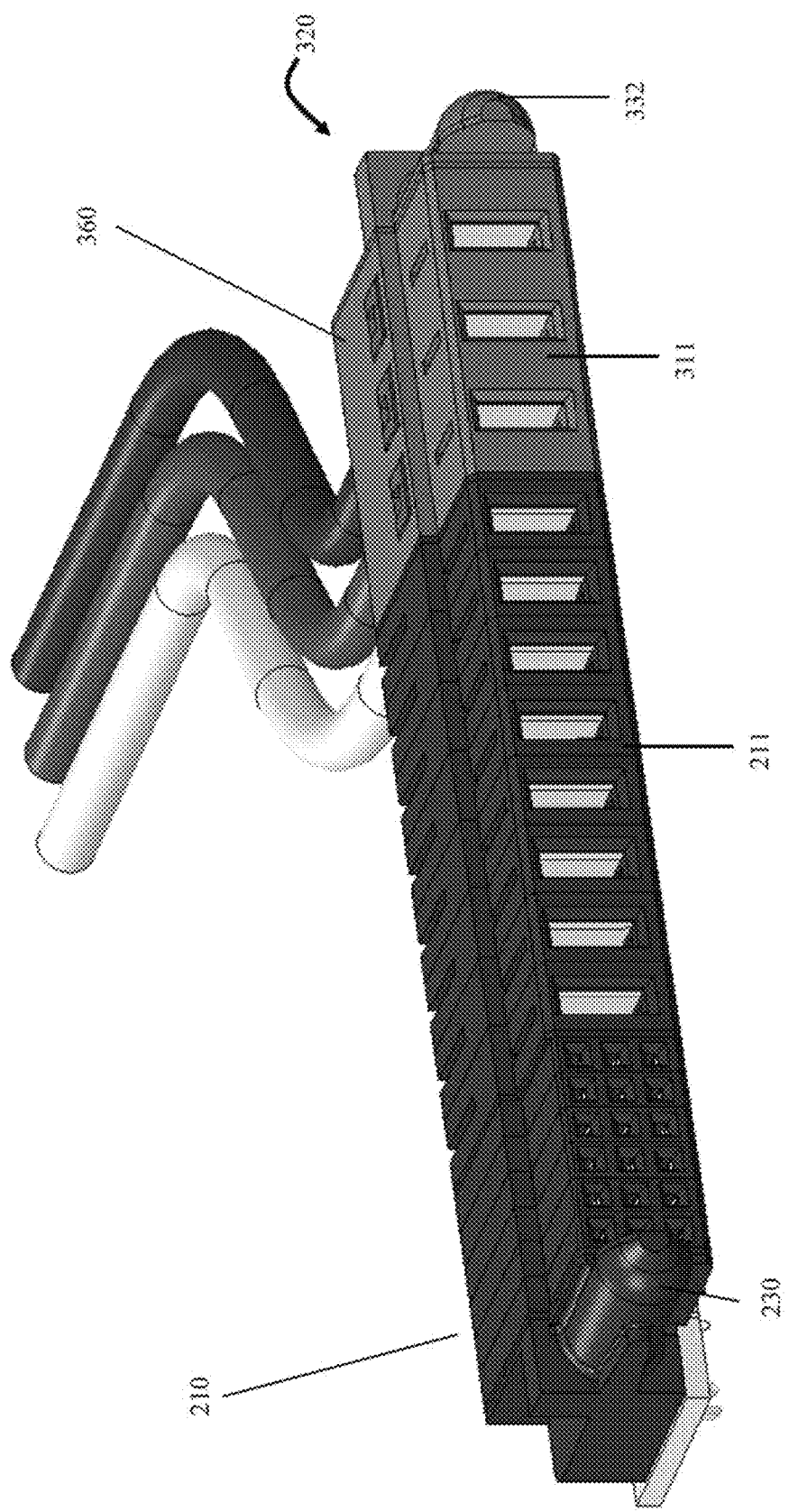
FIG. 7 is a perspective view of an electronic assembly comprising the multi-piece hybrid connector of FIG. 6.

As shown in FIG. 7, when portion 320 is attached to portion 210, mating face 311 will be parallel with and in the same plane as mating face 211. Because of this positioning, mating faces 211 and 311 of portions 210 and 320, respectively, may act as a mating face of a single connector. That connect or may be held to board 250 through the combined action of the board hold-down features of portion 210 and 320. Similarly, guidance features for the single connector may be provided through the combined action of guidance features 230 and 332 on portions 210 and 320, respectfully.

Figure 8:
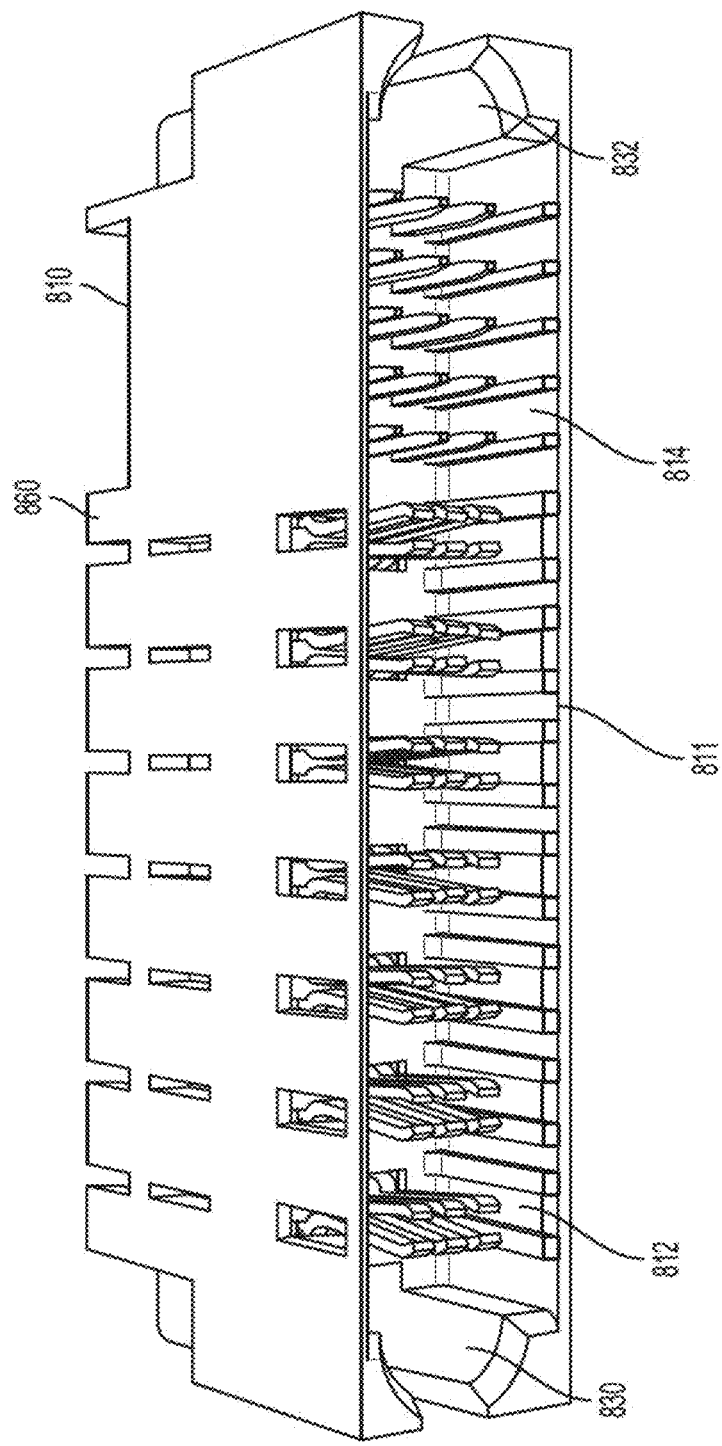
FIG. 8 is a perspective view of an electrical connector suitable for mating to a multi-piece hybrid connector.

A mating connector may mate with the single connector formed by the combination of portions 210 and 320. FIG. 8 is exemplary of such a connector 810. Connector 810 may have a housing 860, which may be a unitary housing formed by molding plastic into a suitable shape or in any other suitable way. Housing 860 may be molded to form a shroud 811, which may encircle the mating faces 211 and 311.

That housing may be populated by mating contacts that are complementary to the mating contact portions of the signal and power conductors in the single connector formed by the combination of portions 210 and 320. Accordingly, connector 810 may include power conductors 812 and signal conductors 814. Signal conductors 814 may have mating contact portions configured as pins as is known in the art or have any other suitable shape that may penetrate openings 214 and mate with signal conductors within portion 210.

Power conductors 812 may have multi-beam power contacts, also as is known in the art. Power conductors 812 alternatively or additionally may have any suitable shape for engaging mating contacts in a mating connector. Any suitable number of such power conductors may be provided. In the example of FIG. 8, only 6 power conductors 812 are illustrated. However, portion 210 has eight openings 212 and portion 320 includes an additional three openings 322, providing in total 11 openings. One of skill in the art will recognize that connector 810 may include 11 power conductors, positioned to engage with the 11 openings as illustrated in FIG. 7 such that connector 810 may mate with the single connector formed by attaching portion 320 to portion 210. It should be appreciated that precise numbers of conductors and openings are provided by way of example only and any suitable numbers of conductors and openings may be provided.

To further support mating of connector 810 to the multi-piece connector formed from portions 210 and 320, connector 810 may include guidance features that are complementary to the guidance features on portions 210 and 320. In the example illustrated, connector 810 includes recesses 830 and 832. Recesses 830 and 832 may be chamfered with lead-in features to accept guidance features, such as guidance features 230 and 332.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. For example, the size of a connector may be increased or decreased from what is shown. Also, it is possible that materials other than those expressly mentioned may be used to construct the connector.

Further, it should be appreciated that the foregoing description focuses on a connector in an electronic assembly. One of skill in the art will appreciate that there are other components of that electronic assembly. For example, only a portion of printed circuit board 250 is expressly illustrated. Other components of an electronic assembly, such as power supplies, power rails, semiconductor chips that consume power, other printed circuit boards that may have similar or complementary conductors.

As another example, FIG. 8 illustrates that a multi-piece connector, such as is formed by attaching portion 320 to portion 210, mates with a connector having a unitary housing. The multi-piece connector may instead mate with a second multi-piece connector. Further, though not illustrated in FIG. 8, a multi-piece connector or a hybrid connector as described herein may mate with a hybrid connector, having conductors, some of which have tails attached to a printed circuit board and some of which have tails attached to cables.

Furthermore, although many inventive aspects are shown and described with reference to a daughterboard connector having a right angle configuration, it should be appreciated that aspects of the present disclosure is not limited in this regard, as any of the inventive concepts, whether alone or in combination with one or more other inventive concepts, may be used in other types of electrical connectors, such as backplane connectors, cable connectors, stacking connectors, mezzanine connectors, I/O connectors, chip sockets, etc.

In some embodiments, contact tails may be configured for surface mount soldering techniques. In this case, connections may be made to vias on a printed circuit board through pads and/or traces within the printed circuit board. Alternatively, the contact tails may be press fit "eye of the needle" compliant sections that are designed to fit within vias of printed circuit boards. Such contact tails may be coupled to the vias as a result of spring force generated by the contact tails, without use of solder. Even if solder is not used to attach a first connector portion, an electronic assembly may nonetheless be exposed to a high temperature that may damage cable insulation during its manufacture. As a result, an assembly in which a second connector portion including conductors attached to cables is attached to a first connector portion after the assembly is exposed to that high temperature may nonetheless have improved reliability.

Further, signal and power conductors are illustrated as having specific shapes. One of skill in the art will understand that other shapes may be used, and that a signal conductor or a ground conductor may be recognized by its shape or measurable characteristics. A signal conductor in many embodiments may be narrow relative to other conductive elements that may serve as reference conductors to provide low inductance. Alternatively or additionally, the signal conductor may have a shape and position relative to another conductive element, which may be another signal conductor or a broader conductive element that can serve as a reference, to provide a characteristic impedance suitable for use in an electronic system, such as in the range of 50-120 Ohms. Alternatively or additionally, in some embodiments, the signal conductors may be recognized based on the relative positioning of conductive structures that serve as shielding.

Accordingly, the present disclosure is not limited to the details of construction or the arrangements of components set forth in the following description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. An electrical connector, comprising:
a first housing portion, comprising a first attachment feature and a first plurality of conductors;
a second housing portion, comprising a second attachment feature and a second plurality of conductors; and
a plurality of elongated pins;
wherein:
the first plurality of conductors comprise tails configured for attachment to a printed circuit board;
the second plurality of conductors comprise tails configured for attachment to wires configured to carry greater than 20 A, wherein the second plurality of conductors are each secured in the second housing portion by a pin of the plurality of elongated pins inserted into the second housing and engaging with a respective conductor of the second plurality of conductors; and
the second attachment feature is configured to engage with the first attachment feature after the first housing portion is attached to the printed circuit board.

2. The electrical connector of claim 1, wherein:
the first housing portion comprises a first guidance feature;
the second housing portion comprises a second guidance feature.

3. The electrical connector of claim 2, in combination with a second electrical connector, wherein the second electrical connector comprises a unitary housing with guidance features that are complementary with the first and second guidance features.

4. The electrical connector of claim 1, wherein:
the first plurality of conductors and the second plurality of conductors are configured as power conductors.

5. The electrical connector of claim 4, wherein:
the first housing portion additionally comprises signal conductors configured to carry signals, wherein the signal conductors have a width that is less than 20% of a width of the power conductors.

6. The electrical connector of claim 1, wherein:
the first plurality of conductors and the second plurality of conductors each has a current carrying capacity in excess of 20 A.

7. The electrical connector of claim 1, wherein the second attachment feature is configured to slidably engage the first attachment feature.

8. The electrical connector of claim 7, wherein:
the first and second attachment features comprise a protrusion and a recess configured to receive the protrusion.

9. The electrical connector of claim 8, wherein the protrusion is a dove-tail.

10. The electrical connector of claim 8, wherein:
the first and second attachment features are formed in respective first and second surfaces of the first and second housing portions, respectively; and
when the first and second attachment features are engaged, the first and second surfaces are held against one another.

11. An electrical connector, comprising:
a first housing portion, comprising a first attachment feature and a first plurality of conductors;
a second housing portion, comprising a second attachment feature and a second plurality of conductors;
wherein:
the first plurality of conductors comprise tails configured for attachment to a printed circuit board;
the second plurality of conductors comprise tails configured for attachment to a wire; and
the second attachment feature is configured to engage with the first attachment feature after the first housing portion is attached to the printed circuit board, wherein:
the first housing portion comprises a first board hold-down feature; and
the second housing portion comprises a second board hold-down feature, wherein the first board hold-down feature and the second board hold-down feature cooperate to provide a board hold-down for the electrical connector.

12. The electrical connector of claim 11, wherein the second attachment feature is configured to slidably engage the first attachment feature.

13. The electrical connector of claim 11, wherein:
the first plurality of conductors and the second plurality of conductors are configured as power conductors.

14. The electrical connector of claim 13, wherein:
the first housing portion additionally comprises signal conductors configured to carry signals, wherein the signal conductors have a width that is less than 20% of a width of the power conductors.

15. An electrical connector, comprising:
a first housing portion, comprising a first attachment feature and a first plurality of conductors;
a second housing portion, comprising a second attachment feature and a second plurality of conductors;
a mating face;
a board mounting face perpendicular to the mating face; and
a rear face parallel to the mating face; wherein:
the first plurality of conductors comprise tails configured for attachment to a printed circuit board;
the second plurality of conductors comprise tails configured for attachment to a wire; and
the second attachment feature is configured to engage with the first attachment feature after the first housing portion is attached to the printed circuit board; and the first plurality of conductors and the second plurality of conductors comprise mating contacts;

the mating contacts are exposed in openings of the mating face;

the first housing portion is configured to expose the tails of the first plurality of conductors at the board mounting face; and the second housing portion is configured to expose the tails of the second plurality of conductors at the rear face.

16. An electrical assembly, comprising the electrical connector of claim 15, which is a first electrical connector and is in combination with:

a printed circuit board, wherein the first housing portion of the electrical connector is mounted to the printed circuit board; and a second connector, configured to mate with the first connector, the second connector comprising a unitary housing; wherein, the first housing portion comprises a first guidance feature;

the second housing portion comprises a second guidance feature; and the first and second guidance features are configured to engage with the second connector.

17. The electrical assembly of claim 16, wherein:

the assembly further comprises wires;

the tails of the first plurality of conductors are coupled to DC supplies through the printed circuit board; and the tails of the second plurality of conductors are coupled to AC supplies through the wires.

18. The electrical assembly of claim 16, wherein the first plurality of conductors and the second plurality of conductors are configured to carry 25 A per contact with less than 30° C. temperature rise above ambient temperature in still air.

19. The electrical assembly of claim 18, wherein at least a portion of the first plurality of conductors or the second plurality of conductors are configured to carry 65 A per contact with less than 30° C. temperature rise above ambient temperature in still air.

20. The electrical assembly of claim 16, wherein the first plurality of conductors and the second plurality of conductors are configured to provide a resistance of less than 0.4 mΩ.

21. The electrical assembly of claim 20, further comprising signal contacts having a resistance of at least 20 mΩ.

22. The electrical connector of claim 15, wherein:

the first housing portion comprises a first guidance feature;

the second housing portion comprises a second guidance feature.

23. The electrical connector of claim 22, in combination with a second electrical connector, wherein the second electrical connector comprises a unitary housing with guidance features that are complementary with the first and second guidance features.

24. The electrical connector of claim 23, wherein the unitary housing is configured to mate with the mating face of the electrical connector and comprises a shroud encircling the first housing portion and the second housing portion.

25. A method of manufacturing an electronic assembly including a printed circuit board having a plurality of vias therein and a connector, the method comprising:

mounting a first portion of the connector to the printed circuit board using a first board hold-down feature, the first board hold-down feature comprising making electrical connections between contacts in the first portion and vias of the printed circuit board; and after mounting the first portion, attaching a second portion of the connector to the first portion of the connector by sliding an engagement feature of the second portion with respect to a complementary engagement feature on the first portion and mounting the second housing portion to the printed circuit board using a second board hold-down feature, wherein the first board hold-down feature and the second board hold-down feature cooperate to provide board hold-down for the electrical connector, and wherein the second portion of the connector comprises contacts attached to cables.

26. The method of claim 25, wherein:

attaching the first portion comprises heating the printed circuit board at a solder reflow temperature;

the cables comprise insulation that degrades at the solder reflow temperature; and attaching a second portion of the connector comprises attaching the second portion after the printed circuit board has cooled from the solder reflow temperature.

27. The method of claim 25, further comprising:

installing a mechanical fastener to attach the second portion to the printed circuit board.

28. The method of claim 25, further comprising:

inserting the contacts with cables attached into a housing of the second portion.

29. The method of claim 28, wherein the contacts with cables attached are inserted into the housing of the second portion before the second portion of the connector is attached to the first portion.

30. The method of claim 25, wherein attaching the second portion to the first portion comprises sliding the second portion towards the printed circuit board.

* * * * *